United States Patent

(12) United States Patent
Just

(10) Patent No.: US 6,328,372 B1
(45) Date of Patent: Dec. 11, 2001

(54) ADJUSTABLE VEHICLE ROOF HAVING A FOLDING TOP

(75) Inventor: Jan Just, Tübingen (DE)

(73) Assignee: CTS Fahrzeug Dachsysteme GmbH, Korntal-Muenchingen (DE)

( * ) Notice: Subject to any disclaimer, the term of this patent is extended or adjusted under 35 U.S.C. 154(b) by 0 days.

(21) Appl. No.: 09/721,905

(22) Filed: May 25, 2001

(30) Foreign Application Priority Data

Nov. 26, 1999 (DE) .............................................. 199 57 012

(51) Int. Cl.[7] ...................................................... B60J 7/00
(52) U.S. Cl. ............... 296/107.12; 296/116; 296/107.09; 296/107.01
(58) Field of Search ............... 296/107.12, 116, 296/107.09, 107.01

(56) References Cited

U.S. PATENT DOCUMENTS

| | | | | |
|---|---|---|---|---|
| 4,693,509 | * | 9/1987 | Moy et al. ............................ | 296/201 |
| 4,747,635 | * | 5/1988 | Wagner ................................. | 296/107 |
| 4,840,419 | * | 6/1989 | Kolb ..................................... | 296/108 |
| 4,991,902 | * | 2/1991 | Schrader et al. ..................... | 296/107 |
| 5,002,330 | * | 3/1991 | Koppenstein et al. ............... | 296/107 |
| 5,267,769 | * | 12/1993 | Bonne et al. ........................ | 296/107 |
| 5,620,226 | * | 4/1997 | Sautter ................................. | 296/107 |
| 5,829,821 | * | 11/1998 | Aydt et al. ............................ | 296/107 |
| 5,918,928 | * | 7/1999 | Kolb et al. ....................... | 296/107.04 |
| 5,938,271 | * | 8/1999 | Schuler et al. .................. | 296/107.12 |
| 5,967,593 | * | 10/1999 | Schuler et al. .................. | 296/107.08 |
| 5,971,470 | * | 10/1999 | May et al. ....................... | 296/107.09 |
| 6,022,064 | * | 2/2000 | Robbins et al. ................. | 296/107.12 |
| 6,042,174 | * | 3/2000 | Durrani ........................... | 296/107.12 |
| 6,139,087 | * | 10/2000 | Wolfmaier et al. ............. | 296/107.16 |
| 6,199,936 | * | 3/2001 | Mac Farland ................... | 296/107.08 |
| 6,209,945 | * | 4/2001 | Aydt et al. ....................... | 296/107.15 |

FOREIGN PATENT DOCUMENTS

| | | |
|---|---|---|
| 30124 II (1154 726) | 3/1959 | (DE) . |
| 40 31 270 C1 | 10/1990 | (DE) . |
| 295 16 415 U1 | 10/1995 | (DE) . |
| 297 12 706 U1 | 7/1997 | (DE) . |
| 298 06 543 U1 | 4/1998 | (DE) . |
| 198 20 711 A1 | 5/1998 | (DE) . |
| 299 09 513 U | 5/1999 | (DE) . |
| 749859A1 | 5/1996 | (EP) . |

* cited by examiner

Primary Examiner—Joseph D. Pape
Assistant Examiner—Kiran B. Patel
(74) Attorney, Agent, or Firm—Crowell & Moring LLP

(57) ABSTRACT

An adjustable vehicle roof having a folding top which can be adjusted between a closed position and a deposited position, and a folding top linkage and a folding top covering material. A material holding bow is connected with the folding top linkage and, in the closed position of the folding top, rests on a rearward, vehicle-body-side component apply tension to the folding top covering material. In order to close off the folding top in a windtight and watertight manner in the closed position while the vehicle body can be freely designed, a tensioning hoop is provided which acts upon the material holding bow in the closed position and which is supported on the folding top linkage.

4 Claims, 3 Drawing Sheets

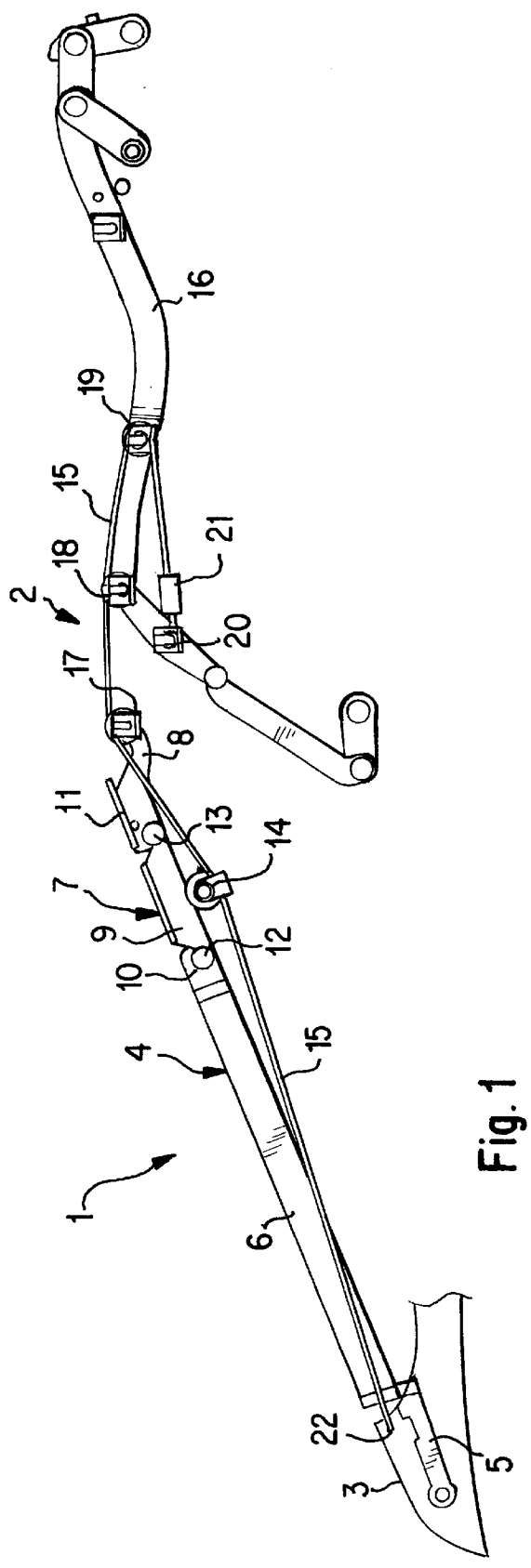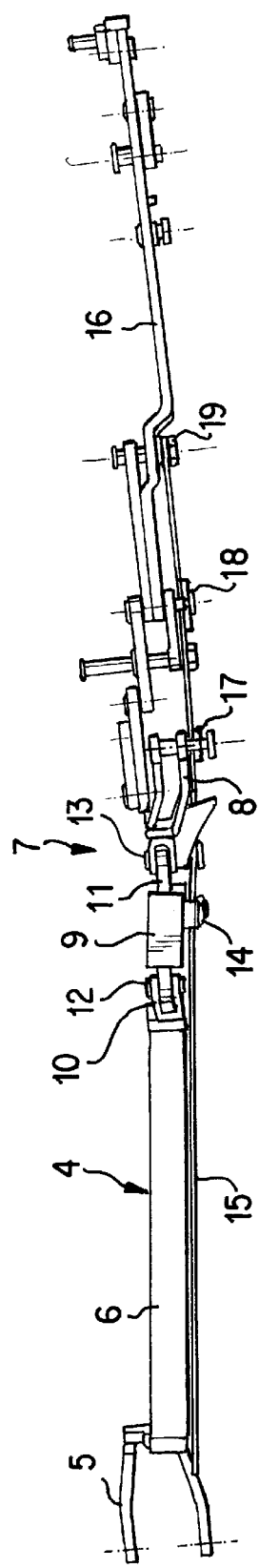
Fig. 1
Fig. 2

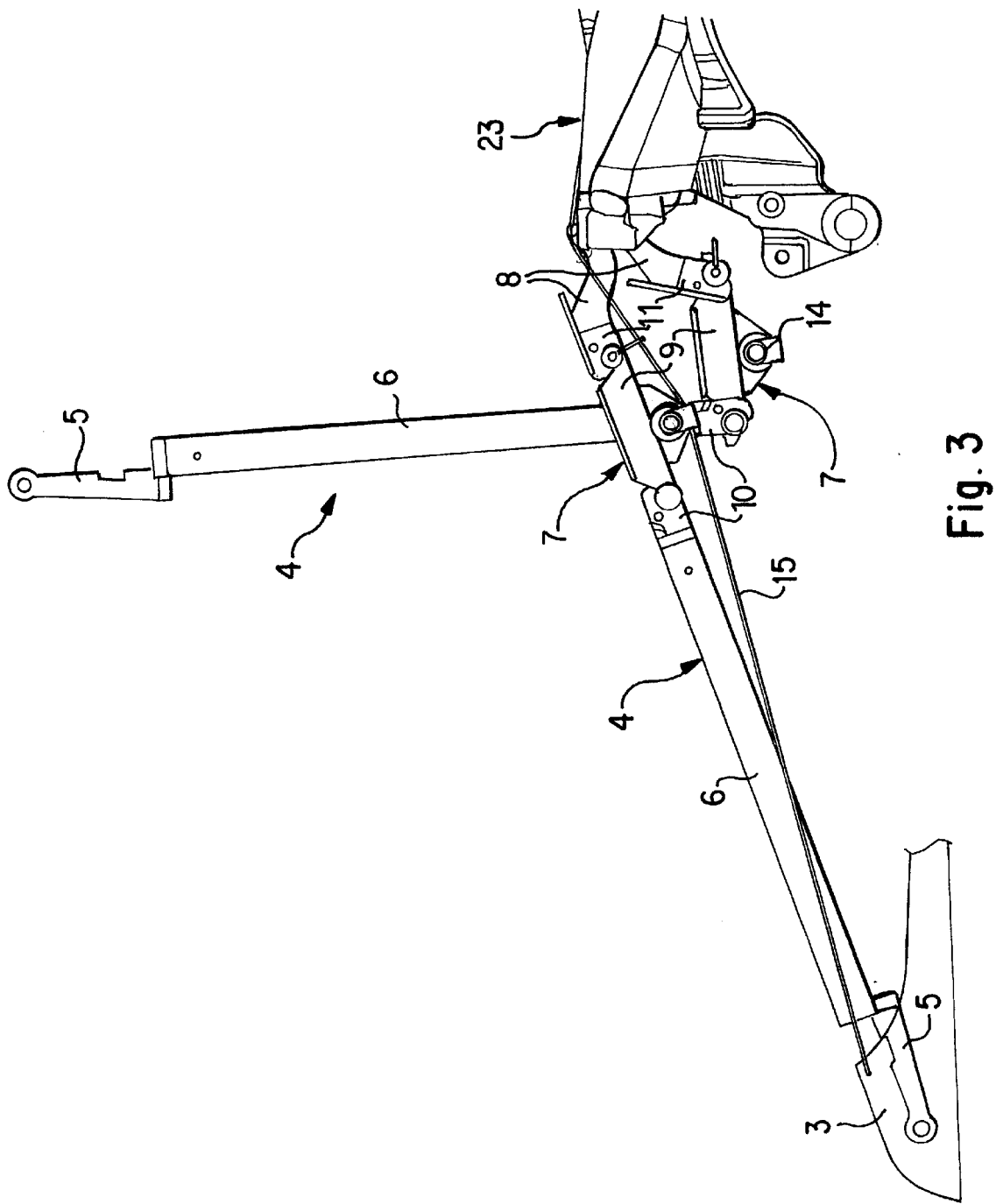

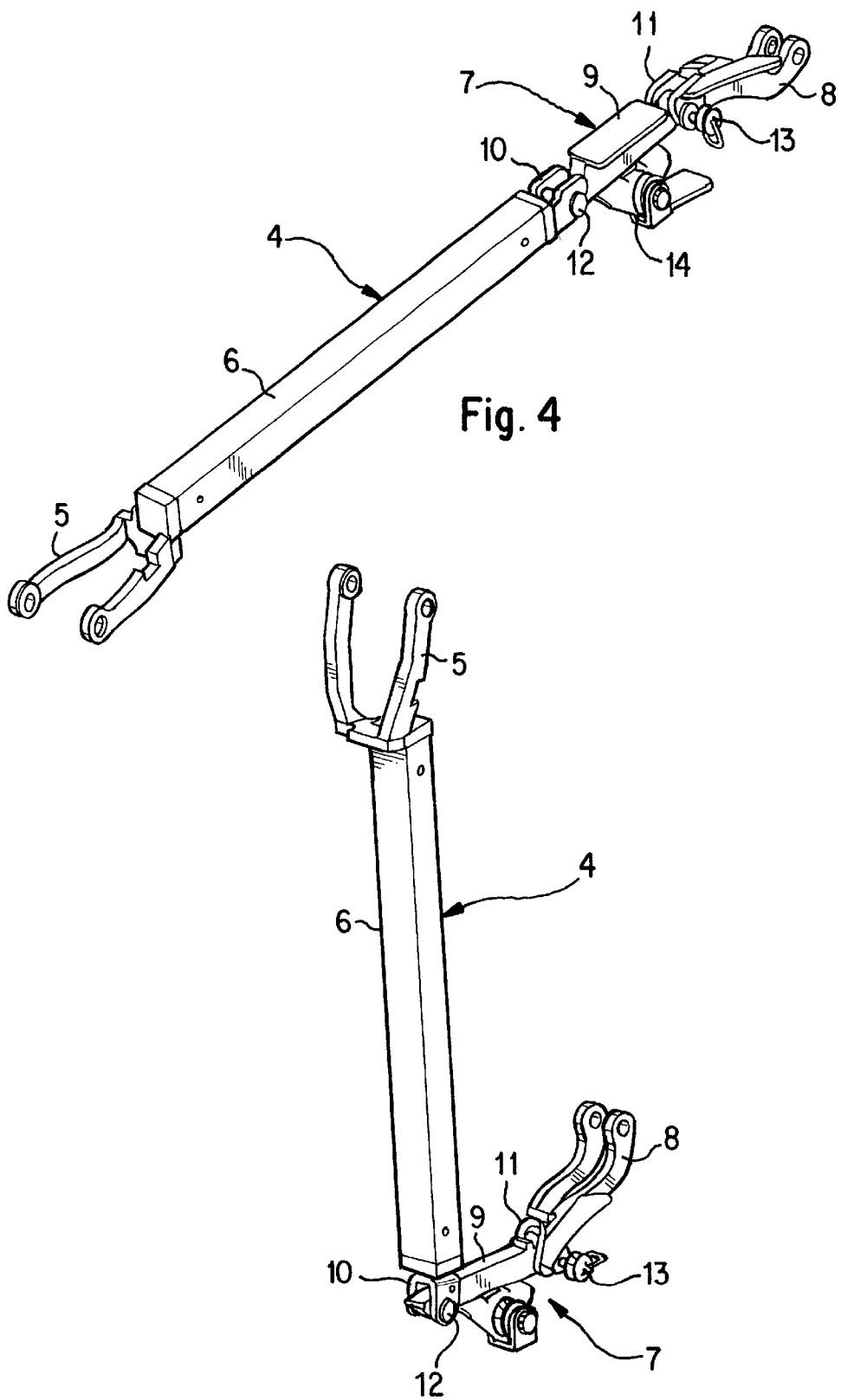

ADJUSTABLE VEHICLE ROOF HAVING A FOLDING TOP

BACKGROUND OF THE INVENTION

The present invention relates to an adjustable vehicle roof having a folding top, and more particularly, to a roof whose folding top can be adjusted between a closed position and a deposited position with a folding top linkage and a folding top covering material, with a material holding bow which is assigned to the folding top linkage and which, in the closed position of the folding top, rests on a rearward, vehicle-body-side component and applies tension to the folding top covering material, with a tensioning hoop which acts upon the material holding bow in the closed position and which is supported on the folding top linkage and has an articulation arrangement with at least one hinge axis transversely arranged with respect to the longitudinal axis of the vehicle, the articulation arrangement being constructed as over-dead-center kinematics.

DE 41 23 516 C1 describes a folding top comprising a plurality of roof frames, bows and hoops assigned to the folding top linkage. The folding top linkage is adjustable by adjusting kinematics between a closed position covering the vehicle interior and a deposited position opening up the vehicle interior. The folding top is deposited in a storage space behind the occupant compartment. In order to ensure that, in the closed position, the folding top covering material is under tension and rests on the folding top linkage, a material holding bow is provided in the rearward area of the vehicle roof and rests in the closed position of the folding top on the folding top compartment lid covering the storage space.

The known material holding bow is connected with the folding top covering material and acts upon the covering material by way of a tension which tightens the material. In order to prevent, as a reaction to the tensioning of the material, in the closed position, the material holding bow lifting off the folding top compartment lid, the material holding bow is held by a locking device on the vehicle body in its position in which it rests on the folding top compartment lid. The locking device consists of a snap lock which, in the closed position of the folding top, causes a locking of the material holding bow with the folding top compartment lid. In order to be able to erect the material holding bow during the transition movement of the folding top from the closed into the deposited position and to be able to open the folding top compartment lid, the snap lock can be unlocked by an electric-motor-driven actuator.

Although such locking devices between the material holding bow and a vehicle-body-side component are characterized by a high transmission of force and correspondingly a secure locking between the bow and the vehicle body, providing the possibility of subjecting the folding top to a high tension in the closed position, the locking device comprises a plurality of components which must be remote-controlled. The functions of the locking device as well as of the adjusting kinematics of the vehicle folding top must therefore be coordinated. Another problem is the fact that, particularly in the deposited position of the folding top, the vehicle-side locking devices become visible and may impair the overall appearance of the vehicle.

The type-forming DE 297 12 706 U1 describes a folding top whose folding top covering material is held under tension by a material holding bow in the closed position of the folding top. The material holding bow is acted upon by a tensioning hoop into which an articulated arrangement is placed which takes up an over-dead-center position in the closed position of the folding top.

Although the over-dead-center position provides a stable position of the tensioning hoop in the closed position of the vehicle roof, the stable position can be maintained only as long as no unacceptably high disturbance forces act upon the articulated arrangement in the tensioning hoop, which may be caused, for example, by the air stream at higher speeds and may be amplified particularly by a wear-caused play in the articulated arrangement. Thus, in the case of this arrangement, there is the risk that the tensioning hoop may accidentally buckle in its articulated arrangement.

SUMMARY OF THE INVENTION

An object of the present invention is to close off the folding top of a vehicle roof of this type in the closed position in a windtight and watertight manner. This solution should permit a free design of the shape of the vehicle body to the extent possible.

According to the present invention, this object has been achieved by providing that, in the closed position, the tensioning hoop is loaded by means of a tensioning cable, which is fastened exclusively on the folding top linkage, into the over-dead-center-position of the over-dead-center kinematics, in that the end of the tensioning cable facing away from the material holding bow is held by way of a tension spring on a bow of the folding top linkage.

According to the novel vehicle roof of the present invention, the material holding bow, which is part of the folding top linkage and, in the closed position of the folding top, rests on the rearward vehicle-body-side component of the vehicle, is held by a fin hoop or tensioning hoop in its position resting on the vehicle body component. Thereby, on one hand, the material tension acting upon the material holding bow will not be capable of releasing the material holding bow from its position on the vehicle body component and, on the other hand, a sufficiently high material tension can be generated by the material holding bow. In this case, the tensioning bow is supported on the folding top linkage so that no additional connections are required, particularly no locking elements, to the vehicle body.

The support of the tensioning hoop on the folding top linkage is sufficient for a stabilization of the material holding bow so that locking elements in the vehicle body, which impair the appearance, can be eliminated without impairing the function of the folding top. The folding top linkage with the tensioning hoop, which stabilizes the material holding bow, forms a system which is closed in itself with respect to forces, so that the vehicle body has to absorb no tension forces for the tensioning of the folding top.

According to an advantageous embodiment, in the closed position, the tensioning hoop extends in the direction of the longitudinal axis of the vehicle. In a customary manner, the folding top linkage unfolds during the closing of the folding top in the longitudinal direction of the vehicle and simultaneously tensions the covering material of the folding top. In this case, the tensioning hoop aligned in the longitudinal direction of the vehicle can optimally absorb tension forces and relieve the material holding bow from these forces or stabilize it.

The tensioning hoop has an articulation arrangement with at least one hinge axis transversely with respect to the longitudinal axis of the vehicle. The articulation arrangement is constructed as over-dead-center kinematics. In this embodiment, the tensioning hoop is loaded in the closed position of the folding top into its over-dead-center position in order to ensure that the tensioning hoop does not buckle when the material is tensioned and is accidentally adjusted in the direction of the deposited position. The over-dead-center kinematics permit the holding of the tensioning hoop in a stable position in the closed position of the folding top with a relatively low force.

Furthermore, a tensioning cable is provided which acts upon the tensioning hoop in the closed position and which imposes a holding force upon the tension hoop in the closed position of the folding top in order to prevent an unintentional snapping-back of the tensioning hoop. In order to avoid introductions of force into the vehicle body, the tensioning cable is fastened exclusively to the folding top linkage so that a loop of forces is implemented which is limited to the folding top linkage. The end of the tensioning cable facing away from the material holding bow is held by way of a tension spring on a bow or another component to be assigned to the folding top linkage. By way of the tension spring, an elastically flexible action of the tensioning cable can be implemented. In addition, a precise adjustment of the holding force acting upon the tensioning hoop in the closed position is permitted.

BRIEF DESCRIPTION OF THE DRAWINGS

These and other features of the invention that will be apparent to those skilled in the art from the following detailed description of the invention, taken together with the accompanying drawings.

FIG. 1 is a side view of a tensioning hoop illustrated in a tensioned position in a vehicle roof, which acts upon a material holding bow in the closed position, the tensioning hoop being connected with a bow of the folding top linkage by a tensioning cable in accordance with the present invention;

FIG. 2 is a top view of the tensioning hoop of FIG. 1;

FIG. 3 is view corresponding to FIG. 1 showing a roof frame which is part of the folding top linkage and on which the tensioning hoop is rotatably disposed;

FIG. 4 is a perspective view of the tensioning hoop of FIGS. 1 and 2 in a stretched-out position corresponding to the closed position of the folding top; and FIG. 5 is a perspective view of the tensioning hoop of FIGS. 1, 2 and 4 but in an intermediate position corresponding to the deposited position of the folding top.

DETAILED DESCRIPTION OF THE DRAWINGS

In the embodiments illustrated in FIGS. 1 to 5, identical components have the same reference numbers.

FIG. 1 shows a cutout or segment of an adjustable vehicle roof which is constructed as a folding top with a folding top linkage 2, on which a folding top covering material is mounted. The folding top is adjustable between the closed position illustrated in FIG. 1 and a deposited position in which the folding top linkage, including the folding top covering material, is deposited in a storage space. To ensure that, in the closed position, the folding top covering material has a sufficient material tension which ensures that the folding top covering material rests firmly on the folding top linkage and a windtight and watertight closure of the vehicle body is provided, in the rearward area of the folding top, a transversely extending material holding bow 3 is arranged to extend transversely to the longitudinal direction of the vehicle and hold the rearward section of the covering material in a tensioned condition downward in the direction of the vehicle body.

The material holding bow 3 is part of the holding top linkage 2 and only has a connection to a tensioning hoop 4 but no connection to a vehicle-body-side component. As a result, the vehicle body covering, on which the material holding bow rests in the closed position of the vehicle folding top, does not have to absorb tensioning or holding forces of the folding top. As illustrated particularly in FIGS. 4 and 5, the tensioning hoop 4 consists of a front-side lower fastening hoop 5 connected with the material holding bow 3, a transmission section 6 adjoining the latter, an articulation arrangement 7 as well as an upper fastening bow 8 which faces the folding top and by of which the connection is established with respect to the remaining folding top linkage. In the area of its front side, the upper fastening bow 8 of the tensioning hoop 4 is connected with a roof frame 23 (see FIG. 3) in an articulated manner which is part of the folding top linkage.

The articulation arrangement 7 comprises a central section 9 which is adjoined in an articulated manner by two lateral sections 10, 11, with the corresponding hinge axes 12, 13 extending between the central section 9 and the lateral sections 10, 11 transversely with respect to the longitudinal direction of the vehicle. The tensioning hoop 4 extends in the longitudinal direction of the vehicle. When the tensioning hoop 4 is moved about the hinge axes 12, 13, it is changed from the tensioned position illustrated in FIG. 1, which corresponds to the closed position of the folding top, into the intermediate position illustrated in FIGS. 3 and 5.

Furthermore, a tensioning cable 15 is guided on the tensioning hoop 4 and, at one end, is fixedly connected by way of a fastening point 22 with the material holding bow 3 and, at its opposite end, is fastened on a bow 16 which is part of the folding top linkage. By way of kinematics, which are not shown, the bow 16 is connected with the roof frame 23 (FIG. 3). In the area of the tensioning hoop 4, the tensioning cable 15 is guided around a cable pulley 14 on the underside of the central articulation section 9 of the articulation arrangement 7 and around another cable pulley 17 which is fastened on the upper fastening bow 8 which is held on the lateral section 11 which is arranged on the side of the tensioning hoop 4 facing the bow 16. At the bow 16, two further cable pulleys 18, 19 are provided to directionally deflect the tensioning cable to its fastening point 20 at the bow 16. A tension spring 21 is integrated in the tensioning cable 15 directly in front of the fastening point 20.

In the closed position of the folding top, the material holding bow 3 is pressed downward by way of the tensioning hoop 4. In this case, the tensioning hoop 4 is held in its tensioning position by way of the tensioned tensioning cable 15. In order to prevent an accidental and unintentional swivelling about the hinge axes 12, 13, which would result in a folding-shut of the tensioning hoop 4 into the position illustrated in FIG. 5, the articulation arrangement 7 is constructed as over-dead-center kinematics which, in the closed position of the tensioning hoop, are acted upon by the tensioning cable 15 into their over-deadcenter position. The cable pulley 14, which is held on the underside of the central articulation section 9, transversely to the longitudinal axis of the tensioning hoop 4, has a distance to the fastening point 22 of the tensioning cable on the material holding bow 3 as well as to the upper cable pulley 17 at the upper fastening bow 8. Because of this transverse distance and the opposed deflection around the cable pulleys 14, 17, a tensioning of the tensioning cable 15 creates a force component transversely to the longitudinal axis of the tensioning hoop 4 onto the lateral articulation sections 10, 11 which acts upon these articulation sections into the over-dead-center position.

When the cable tension is released, the articulation arrangement 7 can leave its over-dead-center position and can tilt about the hinge axes 12, 13. As a result, the tensioning hoop 4 takes up its bowing position as in FIG. 5. The transition from the tensioning position to the bowing position, or from the closed position of the folding top to the deposited position is triggered by an actuator of a known type acting upon the folding top kinematics.

The tension spring 21, which is integrated in the tensioning cable 15, in the tensioned position, permits a behavior of the tensioning cable 15 which has limited elasticity.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Adjustable vehicle roof, comprising a folding top adjustable between a closed position and a deposited position, a folding top linkage, a folding top covering material, a material holding bow operatively associated with the folding top linkage and in the closed position resting on a rearward, vehicle-body-side component to apply tension to the folding top covering material, a tensioning hoop configured to act upon the material holding bow in the closed position and supported on the folding top linkage with an articulation arrangement having at least one hinge axis transversely arranged with respect to a longitudinal vehicle axis, the articulation arrangement comprising over-dead-center kinematics, wherein in the closed position, the tensioning hoop is loaded by a tensioning cable fastened soley on the folding top linkage, into an over-dead-center position of the over-dead-center kinematics, and an end of the tensioning cable facing away from the material holding bow is held by way of a tension spring on a bow of the folding top linkage.

2. Vehicle roof according to claim 1, wherein in the closed position, the tensioning hoop extends in a direction of the longitudinal vehicle axis.

3. Vehicle roof according to claim 1, wherein the end of the tensioning cable facing away from the material holding bow is guided around a deflection pulley operatively held on a bow of the folding top linkage.

4. Vehicle roof according to claim 3, wherein in the closed position, the tensioning hoop extends in a direction of the longitudinal vehicle axis.

\* \* \* \* \*